United States Patent [19]

Enomoto

[11] Patent Number: 4,506,954
[45] Date of Patent: Mar. 26, 1985

[54] MOTOR-DRIVEN REMOTE CONTROL MIRROR DEVICE WITH SHAFT PORTION PIVOT NOT COINCIDENT WITH SHAFT AXIS

[75] Inventor: Masao Enomoto, Isehara, Japan

[73] Assignee: Ichikoh Industries Limited, Tokyo, Japan

[21] Appl. No.: 503,140

[22] PCT Filed: Oct. 8, 1982

[86] PCT No.: PCT/JP82/00404
§ 371 Date: Jun. 3, 1983
§ 102(e) Date: Jun. 3, 1983

[87] PCT Pub. No.: WO83/01232
PCT Pub. Date: Apr. 14, 1983

[30] Foreign Application Priority Data

Oct. 9, 1981 [JP] Japan .............................. 56-149568[U]

[51] Int. Cl.³ ................................................ G02B 7/18
[52] U.S. Cl. .................................................... 350/634
[58] Field of Search .......................... 350/289; 248/487

[56] References Cited

U.S. PATENT DOCUMENTS 3,609,014 9/1971 Kurz, Jr. ............................ 350/289

FOREIGN PATENT DOCUMENTS 52-72256 5/1977 Japan .
52-31618 8/1977 Japan .
55-48514 3/1980 Japan .

Primary Examiner—Jon W. Henry
Attorney, Agent, or Firm—Cushman, Darby & Cushman

[57] ABSTRACT

A motor-driven remote control mirror device comprising: a mirror body (22) supporting a mirror (21), and a forwardly and backwardly movable rod (56) adapted to be contact with the back surface of the mirror body (22) for inclining the mirror body (22) around horizontal and vertical axes thereof; the center of a pivot (55) formed at the end of the rod (56) and in contact with the mirror body (22) being arranged at a position which is displaced $\Delta l$ from the center axis ($l_1$) of the shaft portion (57) of the rod (56) so that the rod (56) is prevented from being rotated around the axis of the shaft portion (57) of the rod (56), thereby image fluctuation due to minute vibrations can be prevented when inclining the mirror surface.

1 Claim, 9 Drawing Figures

MOTOR-DRIVEN REMOTE CONTROL MIRROR DEVICE WITH SHAFT PORTION PIVOT NOT COINCIDENT WITH SHAFT AXIS

FIELD OF THE INVENTION

The present invention relates to a motor-driven remote-control rearview mirror device in which longitudinally movable rods are used to adjust horizontally and vertically the angular position of the mirror body which supports the mirror, for thereby providing a most convenient rearviewing.

BACKGROUND ART

The motor-driven remote-control rearview mirrors of this type are used on many vehicles externally thereof. The details of such electric remote-control rearview mirror are disclosed in the U.S. Pat. No. 3,609,014. FIG. 1 is a sectional view of this type of power operated remote-control rearview mirror assembly. A backing plate 2 supporting a mirror 1 is mounted on a pivot 4 for horizontal and vertical angular movement therearound. The backing plate 2 is supported by means of the pivot 4 fixed to a mirror shell 3 and which is fitted in a spherical seat 4a provided on the opposite side of the backing plate 2 to that where the mirror is located. Further, two drive motors 11 for angular movement of the backing plate 2 are provided as fastened within the mirror shell 3, one for the horizontal angular movement of the mirror 1 and the other for the vertical angular movement. Each motor 11 is provided with a worm gear which is in mesh with a reduction gear 9. The reduction gear 9 has screwed through the center thereof a rod 8 which is directed perpendicular to the output shaft of the motor 11. That is, the reduction gear 9 has formed therein along the center axis a threaded hole and the rod has formed on the outer circumference thereof a thread corresponding to that of the hole. Thus, the rotational movement of the reduction gear 9 is converted to linear movement of the rod 8. The end of the rod is formed like a ball which is fitted in a spherial seat 6 provided on the backing plate 2. The ball portion 7 of the rod 8 and the spherical seat 6 form together a ball joint, and a hair pin-shaped spring 12 is provided as engaged in the recess formed in the ball portion 7 and pinching the ball portion 7, for thereby preventing the rod 8 from being rotated around the axis thereof.

The conventional remote-control mirror assemblies are build as having been explained in the above. However, the hair pin-shaped spring 12 provided pinching the ball portion 7 in the recess cannot provide complete prevention of the rod 8 from being rotated. Specifically, when the rod 8 is extended as shown in FIG. 1, the rod cannot be fully prevented from being rotated, and also the backing plate 2 cannot be stably supported, resulting in the oscillation of the mirror 1 during the running of the vehicle.

The present invention has the object to overcome the above-mentioned drawbacks of the prior-art motor-driven remote-control mirror assemblies, by providing a power operated remote-control mirror assembly of which the mirror can be positively angulated to an intended position and stably kept there without any vibration of the mirror surface even while the vehicle is running.

DISCLOSURE OF THE INVENTION

The above-mentioned object can be attained by providing motor-driven remote-control mirror device characterized, in accordance with the present invention, in that it comprises mirror body supporting a mirror and which is supported itself for angular movement within a mirror shell, electric motors as drive for the mirror, which are fixed within the mirror shell, and means to convert the rotation of the motor to linear motion and to convey it to the mirror body, this means being comprised of a gear mechanism mechanically coupled with the motor, a shaft fixed to the gear mechanism and provided with a spiral recess in which a hair pin-shaped spring is engaged, and a pivot formed as extended from one end of the shaft and fitted in a seat formed on the rear surface of the mirror body, the pivot being disposed with the center thereof not coincident with the axis of the shaft, so that the shaft is prevented from being rotated around the axis thereof.

These and other objects and advantages of the present invention will be better understood from the ensuing description made, by way of example, of one embodiment according to the present invention with reference to the drawings.

BRIEF DESCRIPTION OF THE DRAWINGS

FIGS. 2 to 9 show together an embodiment of electric remote-control mirror device according to the present invention, of which FIG. 2 is a front view, FIG. 3 is a plan view, FIG. 4 is a sectional view taken along the line IV—IV of FIG. 2, FIG. 5 is a sectional view taken along the line V—V of FIG. 3, with the section of the drive being eliminated, FIG. 6 is a front view of the drive with a partial cut-away view of the drive casing, FIG. 7 is a partial cut-away sectional view showing the coupling between the backing plate and the drive, FIG. 8 is a sectional view, in larger scale, of the essential portion of the drive, and FIG. 9 is a sectional view taken along the line IX—IX of FIG. 8.

DETAILED DESCRIPTION OF THE PREFERRED EMBODIMENT

Figure 1:
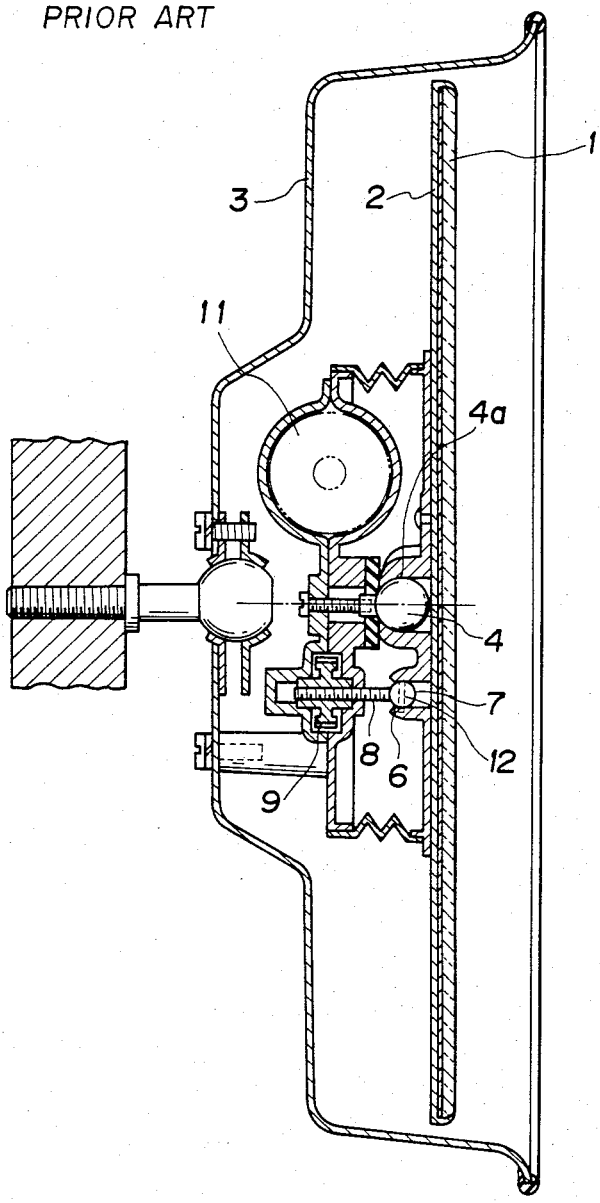
FIG. 1 is a sectional view of a prior-art motor-driven remote-control mirror assembly.

Referring now to the drawings, the most preferred embodiment of electric remote-control rearview mirror according to the present invention will be described. This embodiment is an electric remote-control rearview mirror with buffer mechanism intended for use as mounted outside a vehicle and at the right or left side of the vehicle.

Figure 2:
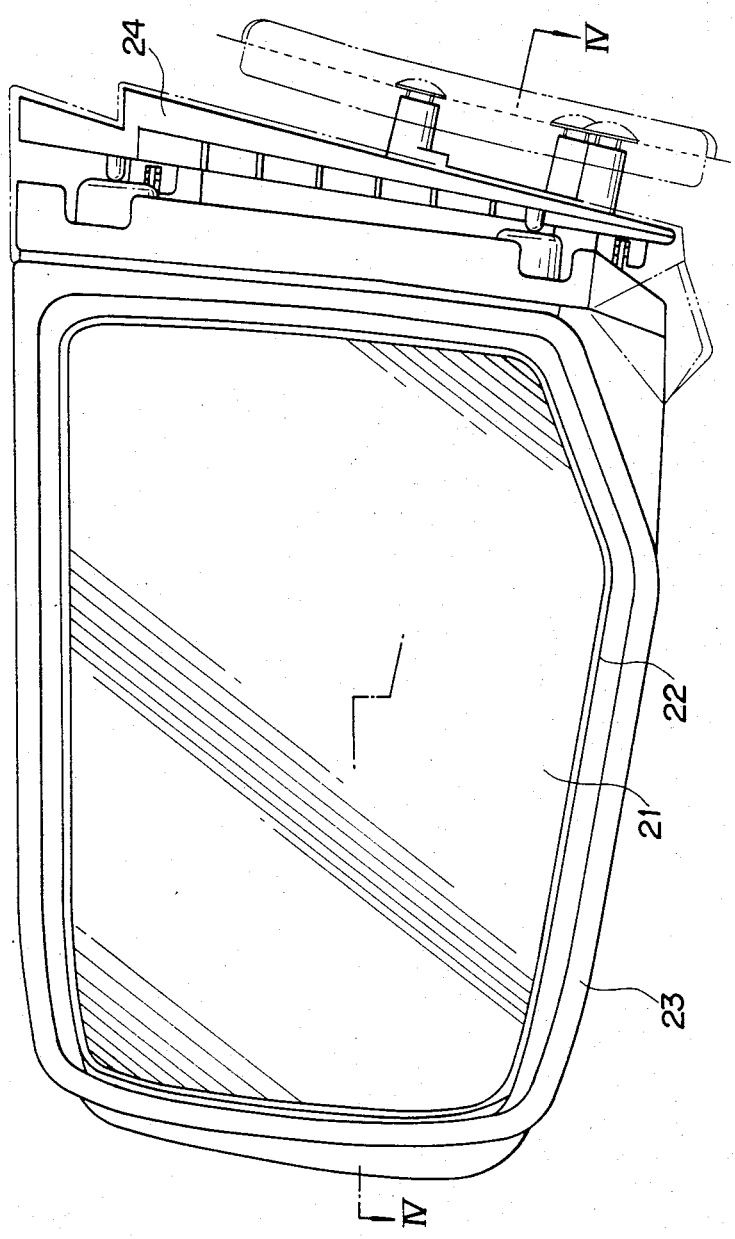
Figure 3:
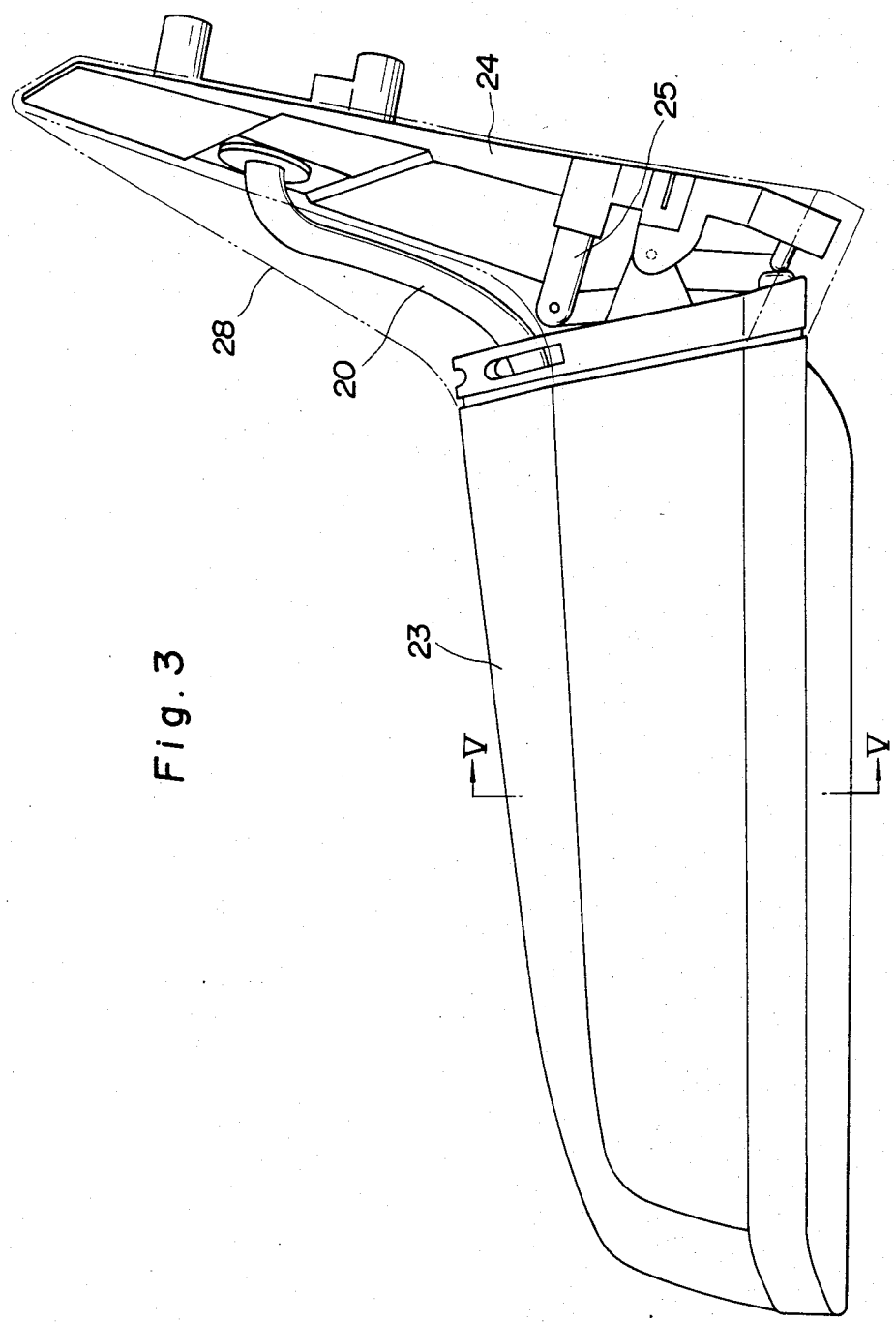

FIG. 2 is a front view of the electric remote-control mirror according to the present invention, and FIG. 3 is a plan view thereof. A mirror 21 is fastened to a mirror body 22 which is disposed for angular movement with respect to a mirror shell 23. The mirror shall 23 is supported by a mount base 24 adjacent to the windshield of the car driver's side door. The mirror shell 23 is produced separately from the mount base 24, hinged to the latter by means of a hinge 25 for angular movement, and forced by a spring 26 toward the mount base 24. More particularly, the mirror shell 23 is made to abut the mount base 24 under the elastic action of the coil spring 26 of which the one end is fixed within the mirror shell 23 while the other end if fixed to the mount base 24. This arrangement is made so that when subjected to a strong force of any external object, the mirror shell 23 is angularly moved with respect to the mount base 24, for thereby minimizing the damage to the external object and mirror shell 23 at such time. There is usually provided between the mirror shell 23 and mount base 24 a cover 28 made of synthetic rubber, as shown in FIG. 3. This cover is intended for protection of the parts and units located within the mirror shell 23 against the wind and rain as well as for minimization of the influence of the wind pressure on them.

Figure 4:
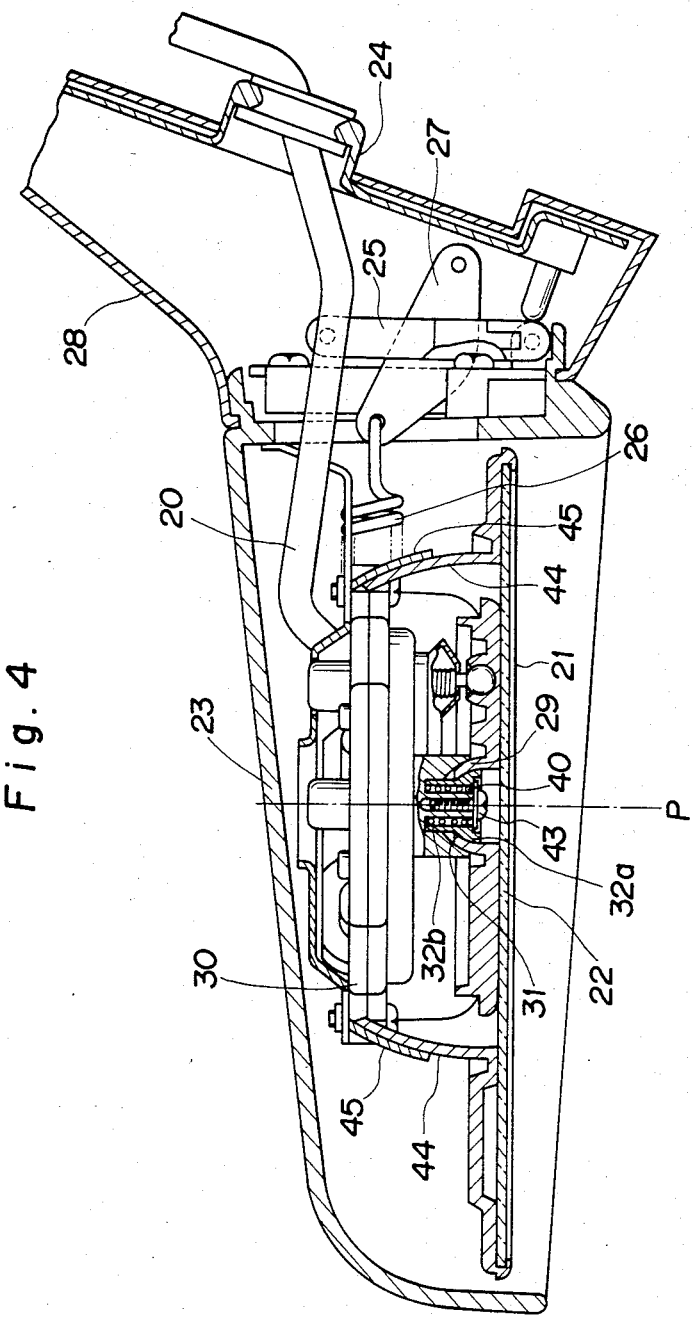
Figure 5:
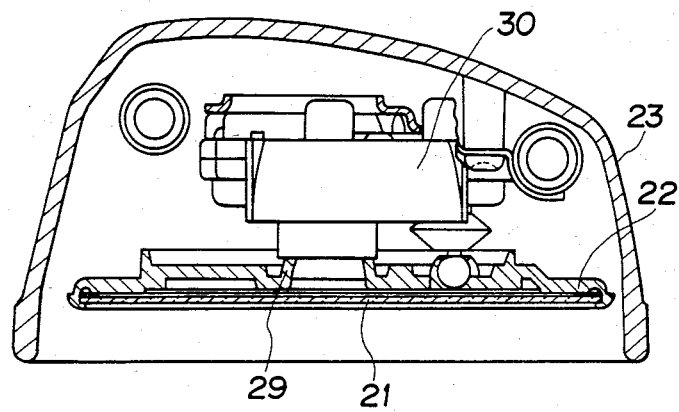

The motor-driven remote-control mirror device is so designed that the drive motors provided within the mirror shell are made to run under the control of the control unit provided in the car interior, for horizontal and vertical angular movement of the mirror 21. The reference numeral 20 in FIG. 4 indicates an interconnecting cord which provides electrical connection between the drive motor (will be further described later) and the control unit provided inside the car. According to this embodiment, a semi-spheric portion 29 is provided as protruded nearly at the rear center of the mirror body 22 which supports the mirror 21, while a concave spheric seat 31 is integrally formed on a casing which accomodates the drive motor and the other. The spheric seat 31 is to receive the semi-spheric portion 29. The casing 31 is fixed to the mirror shell 23 as shown in FIG. 5. The concave spherical seat 31 is formed to receive the semi-spheric portion 29, as having been mentioned. These parts are engaged on each other by means of a presssuring member 32, forming a pivot joint. More specifically, the concave spherical seat 31 has a semi-spheric concave face symmetrical with respect to a pivot axis P, columnar hole 33 concentric to the pivot shaft P and a protruding stripe formed on the side wall of the hole 33 and extending in parallel with the pivot axis P.

The semi-spheric portion 29 formed on the mirror body 22 has an opening 35 on the rear side of the mirror 21 and also an opening 36 on the side facing the concave spherical seat 31. A hollow portion is defined by both these openings and the semi-spheric portion 29. The above-mentioned pressurizing member 32 is composed of a semi-spheric portion 32a which has a same curvature as the circumference of the semi-spheric portion 29, and a cylindrical portion 32b of which the outside diameter is nearly equal to the inside diameter of the hole 33, these portions being integrally formed contiguous to each other. The cylindrical portion 32b penetrates through the opening 36 and attains the bottom of the hole 33, and has formed in the base portion thereof a recess which is fitted onto the protruding stripe formed on the side face of the hole 33. A coil spring 40 is disposed in the cylindrical portion 32b. The one end of the coil spring 40 is received by the spring seat formed on the bottom of the cylindrical portion 32b. The protrusion 41 vertically extending from the bottom of the columnar hole 33 is disposed inside the coil spring 40 and has formed at the top thereof a screw hole 41a. A washer 42 is made to abut the other end of the coil spring 40 so that the pressurizing member 32 is formed toward the spherical seat 31 by means of the coil spring, and a screw 43 is screwed into the screw hole 41a from above the washer 42. Thus, the semi-spheric portion 29 formed on the backing plate 22 is forced to the spherical seat 31 with a constant force under the action of the spring coil 40 and engaged on the concave semi-spheric portion under a stable pressure.

The pressurizing member 32 and concave spheric portion 31 are prevented by the protruding stripe and recess from being rotated so that the semi-spheric portion 29 is in contact with the semi-spheric portion 32a of the pressurizing member 32 under a constant pressure. Thus, the semi-spheric portion 29 is pinched between the pressurizing member 32 not rotatable around the pivot axis P and the concave spherical seat 31 and stably kept against rotation around the pivot axis P under the effect of frictional force.

Further, according to this embodiment, the electric remote-control mirror is provided with a mechanism which acts to attenuate the vibration of the mirror body 22. This mechanism is composed of a pair of walls 44 formed on the rear side of the mirror body 22 and spherical seats 45 engaging the outer portion of the walls, respectively, and formed integrally with the above-mentioned casing 30. The walls 44 are disposed symmetrically with the pivot axis P and their outer portions are formed as a portion of the sphere around the screw 43 lying along the pivot axis. The spherical seats 45 formed on the casing 30 are so formed that when the backing plate 22 is angularly moved around the pivot axis P, the outer portions of the walls 44 come into contact with each other. That is to say, the inner circumference of the spherical seats 45 are formed in the circumference of a nearly same radius as that of the outer portions of the walls 44, and while the mirror body 22 is kept horizontal, the the inner portions of the spherical seats 45 and the outer portions of the walls 44 are kept in contact with each other. Both these portions are so designed as to slide away from each other when the mirror body 22 is angularly moved, for thereby interfering with no angular movement of the mirror body 22.

Figure 6:
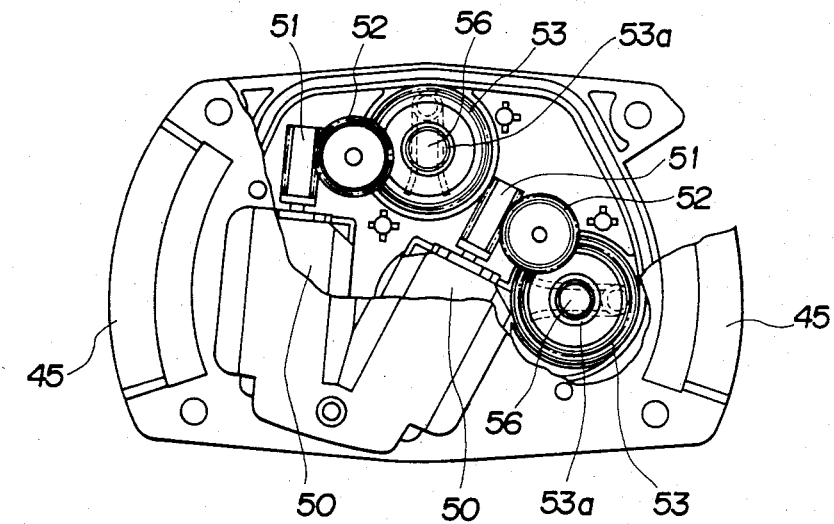
Figure 7:
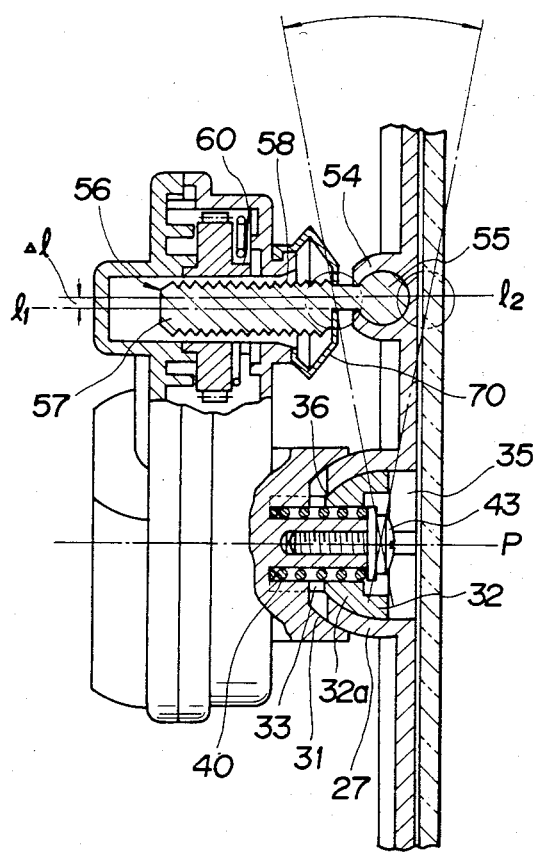
Figure 8:
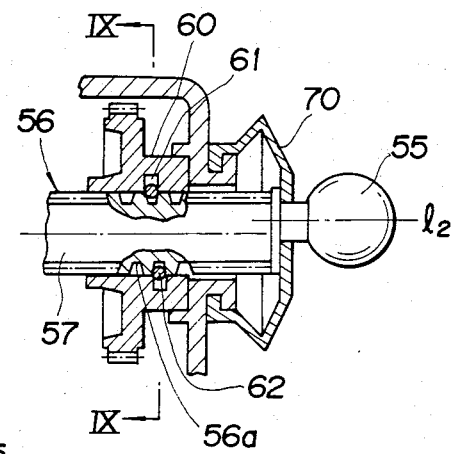
Figure 9:
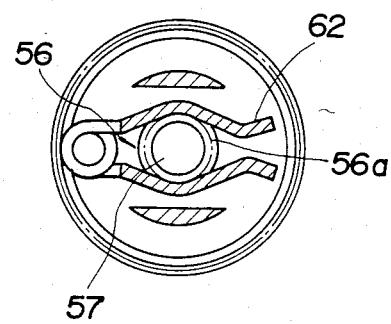

From the foregoing description, the manner of supporting the mirror body 22 is believed to have been well understood. The angular motion of the backing plate is given by the motors fixed within the casing 30. FIG. 6 is an illustration with a part of the casing 30 cut away. There are provided two separate motors 50 for angular movements of the mirror body 22 around the vertical and horizontal axes, respectively, thereof. The numeral 51 refers to worm gears each fixed to the output shaft of the motor, and 52 refers to spur gears each screwed to the worm gear 51. There is provided concentrically to the spur gear 52 a spur gear which has the tooth number smaller than that of the spur gear 52 and to which a spur gear 53 with the tooth number being larger than that of the gear 52 is screwed. These spur gears act to slow down the rotation of the motor 50. The spur gear 53 is rotatably supported by the casing 30 and it has formed in the center thereof an opening 53a through which a rod is inserted. This rod 56 consists of a shaft portion 57 with thread 58 formed on the outer circumference and a pivot 55 formed on the extended end of the shaft portion 57. The shaft portion 57 is disposed in a direction perpendicular to the plane of FIG. 6. A boss-like protrusion 60 is formed outside the opening 53a in the spur gear 53 as shown in FIG. 7, and there is formed in that protrusion a square hole 61 along a plane nearly perpendicular to the axis of the shaft 57. This square hole 61 is formed along a spiral plane twisted an angle corresponding to the pitch of a screw 58. Inserted in this square hole 61 is a twisted hair pin-shaped spring 62 which pinches the shaft 57 in the thread spaces of the thread 58 formed on the outer circumference.

The pivot 55 formed on the rod 56 is fitted in the seat 54 formed on the rear side of the mirror body 22. Further, the pivot 55 is disposed with the center displaced Δl from the axis $l_1$ of the shaft 57. That is, the straight line $l_2$ passing by the center of the pivot 55 and parallel to the shaft 57 and the axis $l_1$ of the shaft 57 are distant Δl from each other. The seat 54 receiving the pivot 55 is disposed around the semi-spherical portion 29 by which the backing plate 22 is supported nearly at the center on the rear side, and on the vertical axis and horizontal axis which are perpendicular to each other. The rod 56 is longitudinally moved by the motors 50 to permit angular movement of the mirror body 22 around the horizontal and vertical axes, respectively. The shaft portion 57 of the rod 56 is moved longitudinally to delineate a linear motion, while the pivot 55 follows up, as fitted in the seat 54, with the angular movement of the mirror body 22. For this purpose, the neck portion between the shaft portion 57 and the pivot 55 is so shaped as to follow the angular movement of the mirror body 22. The numeral 70 refers to a water-proof cover which is disposed to protect two rods 56 simultaneously.

As having been described in the foregoing, with the motor-driven remote-control mirror device according to the present invention, as the motor 50 located within the casing 30 is made to run, the revolution of the motor is slowed down by the reduction gear to rotate the spur gear 53. Along with the rotation of the spur gear, the hair pin-shaped spring 62 integrally fitted on the spur gear 53 is also rotated with the spur gear 53. The rod 56 engaged with the spring 62 in the thread spaces 56a is longitudinally moved with respect to the spring 62 since the spring 62 is rotated. Since the spring 62 and the shaft portion 57 of the rod 56 are pressure-fitted to each other, the friction between them will cause the rod 56 to be rotated along with the rotation of the spring 62. However, as the axis $l_1$ of the shaft portion 57 of the rod is displaced Δl from the axis $l_2$ of the pivot 55, the pivot 55 is made to rotate along an oval course while the shaft portion 57 is being rotated. This irregular rotation will cause the pivot 55 to be forcibly pressed to the inner circumference of the seat 54. The pressure overcomes the pressure of engagement of the spring 62 onto the shaft portion 57 of the rod 56, thus preventing the rod 56 from being rotated. Accordingly, the rotation of the motor 50 is transmitted effectively to the rod 56 through the spur gear 53 and spring 62 so that the rod 56 is smoothly moved longitudinally. Consequently, the mirror body 22 is angularly moved in a stable manner, and thus; a bad field of view due to flickering of the image on the mirror which has so far been caused by the fine or minute vibration, will be eliminated.

As it is obvious to those skilled in the art, the present invention is not limited only to the preferred embodiment having been described in the foregoing, but may be embodied in many different forms without departing from the scope of the claim and spirit of the present invention.

What is claimed is:

1. A motor-driven remote-control mirror device, comprising:

a mirror body (22) supporting a mirror (21) and which is supported itself for angular movement within a mirror shell (23);

electric motors (5) as drive for said mirror (21), which are fixed within said mirror shell (23); and means to convert the rotation of the motor (50) to linear motion and to convey it to the mirror body (22), said means being comprised of a gear mechanism (53) mechanically coupled with said motor (50);

a shaft (57) fixed to said gear mechanism (53) and provided with a spiral recess in which a hair pin-shaped spring (62) is engaged; and a pivot (55) formed as extended from one end of said shaft (57) and fitted in a seat (54) formed on the rear surface of said mirror body (22);

said pivot being disposed with the center thereof not coincident with the axis of said shaft (57), so that said shaft (57) is prevented from being rotated around the axis thereof.

* * * * *